US012700183B1

(12) United States Patent　　　(10) Patent No.:　US 12,700,183 B1

Lu et al.　　　(45) Date of Patent:　　　Aug. 4, 2026

(54) GENERATING 3D REPRESENTATIONS OF PHYSICAL ENVIRONMENTS USING KEY FRAMES

(71) Applicant: Apple Inc., Cupertino, CA (US)

(72) Inventors: Yao Lu, Sunnyvale, CA (US); Giulio Marin, Palo Alto, CA (US); Yu Ping Lin, San Jose, CA (US); Kyle L Simek, Sunnyvale, CA (US); Ming Chuang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 18/205,469

(22) Filed: Jun. 2, 2023

Related U.S. Application Data

(60) Provisional application No. 63/348,777, filed on Jun. 3, 2022.

(51) Int. Cl.
```
G06T 7/579        (2017.01)
G06T 5/50         (2006.01)
G06T 7/12         (2017.01)
G06T 7/70         (2017.01)
G06T 17/20        (2006.01)
G06V 10/25        (2022.01)
G06V 10/74        (2022.01)
```
(52) U.S. Cl.
CPC .............. G06T 17/205 (2013.01); G06T 5/50 (2013.01); G06T 7/12 (2017.01); G06T 7/579 (2017.01); G06T 7/70 (2017.01); G06V 10/25 (2022.01); G06V 10/761 (2022.01); *G06T 2207/10028* (2013.01); *G06T 2207/20221* (2013.01)

(58) Field of Classification Search
CPC . G06T 5/50; G06T 2207/20221; G06T 7/579; G06T 7/70

USPC .......................................................... 345/419
See application file for complete search history.

(56) References Cited

U.S. PATENT DOCUMENTS

| 11,676,334 | B2 * | 6/2023 | Lee | G06T 17/00 |
| | | | | 345/419 |
| 2013/0329012 | A1 * | 12/2013 | Bartos | G06T 7/80 |
| | | | | 348/46 |
| 2014/0363087 | A1 * | 12/2014 | Tico | G06T 5/10 |
| | | | | 382/195 |

(Continued)

OTHER PUBLICATIONS

Munguia et al., A Hybrid Visual-Based SLAM Architecture: Local Filter-Based SLAM with KeyFrame-Based Global Mapping, Published: Dec. 29, 2021, Sensors 2022, 22, 210, pp. 1-22 (Year: 2021).*

(Continued)

*Primary Examiner* — Samantha (Yuehan) Wang
(74) *Attorney, Agent, or Firm* — Thompson Hine LLP

(57) ABSTRACT

Various implementations disclosed herein include devices, systems, and methods that use frames of sensor data to create key frames that are used to provide a 3D representation of a physical environment (e.g., a 3D mesh, planar representations, object bounding boxes, a combo of these, etc.). Some implementations use key frames (e.g., bundles of 2D image data deemed to be representative or useful for reconstruction/3D representation generation). Such key frames may be created by evaluating multiple frames of sensor data and determining whether to convert a given frame into a key frame or fuse it, e.g., fuse it with a nearest existing key frame. Such fusing may reduce loss of information which would occur if frames not selected as key frames are simply discarded.

21 Claims, 8 Drawing Sheets

(56) References Cited

U.S. PATENT DOCUMENTS

| | | | |
|---|---|---|---|
| 2020/0043189 A1 * | 2/2020 | Bao | ........................... G06T 7/75 |
| 2022/0398804 A1 * | 12/2022 | Yakubenko | ............. G06T 17/05 |

OTHER PUBLICATIONS

Yang et al., Global 3D Non-Rigid Registration of Deformable Objects Using a Single RGB-D Camera, IEEE Transactions on Image Processing, vol. 28, No. 10, Oct. 2019, pp. 4746-4761 (Year: 2019).*

* cited by examiner

100

190

120

130

140

150

160

180

102

110

170

200

210

300a

300b

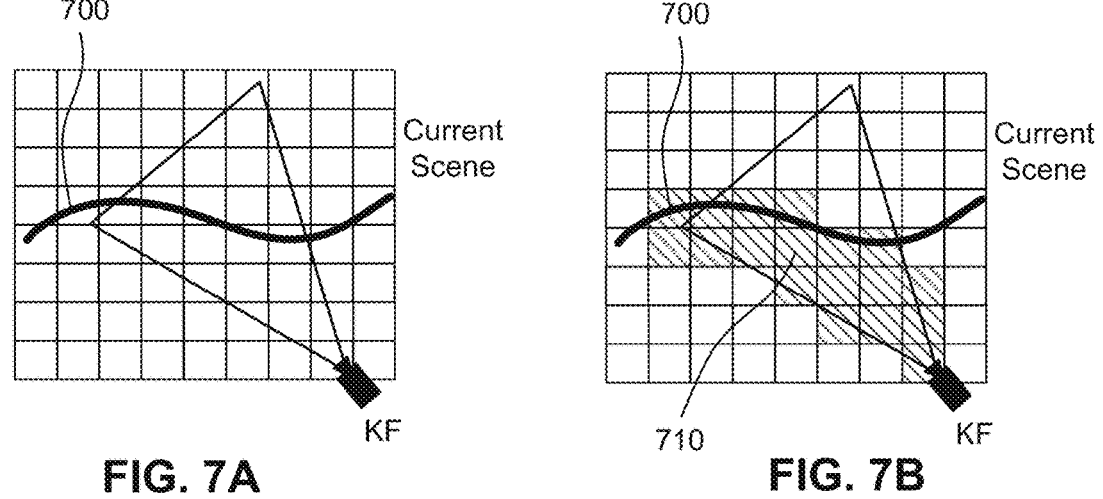
FIG. 7A
FIG. 7B
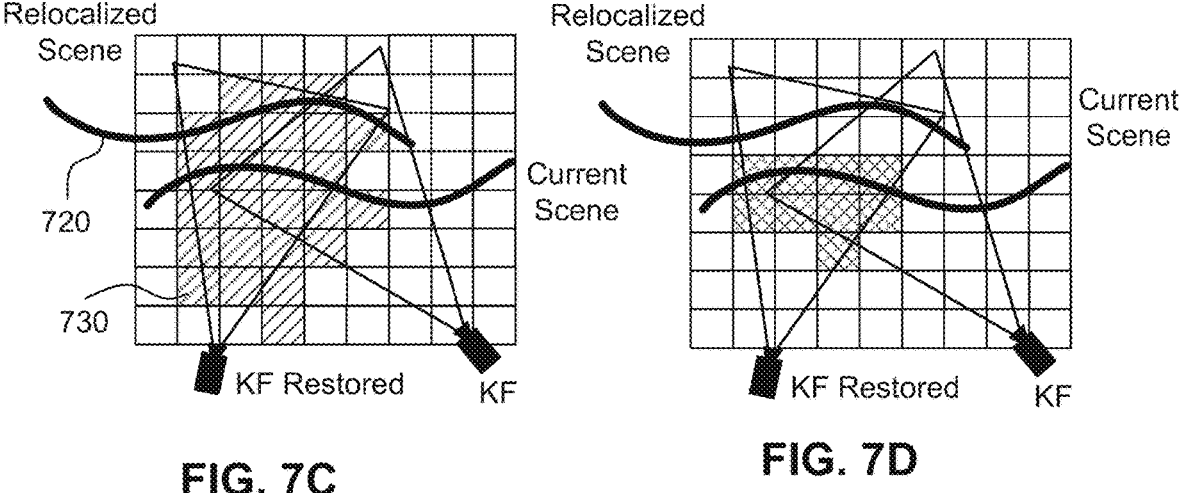
FIG. 7C
FIG. 7D

800

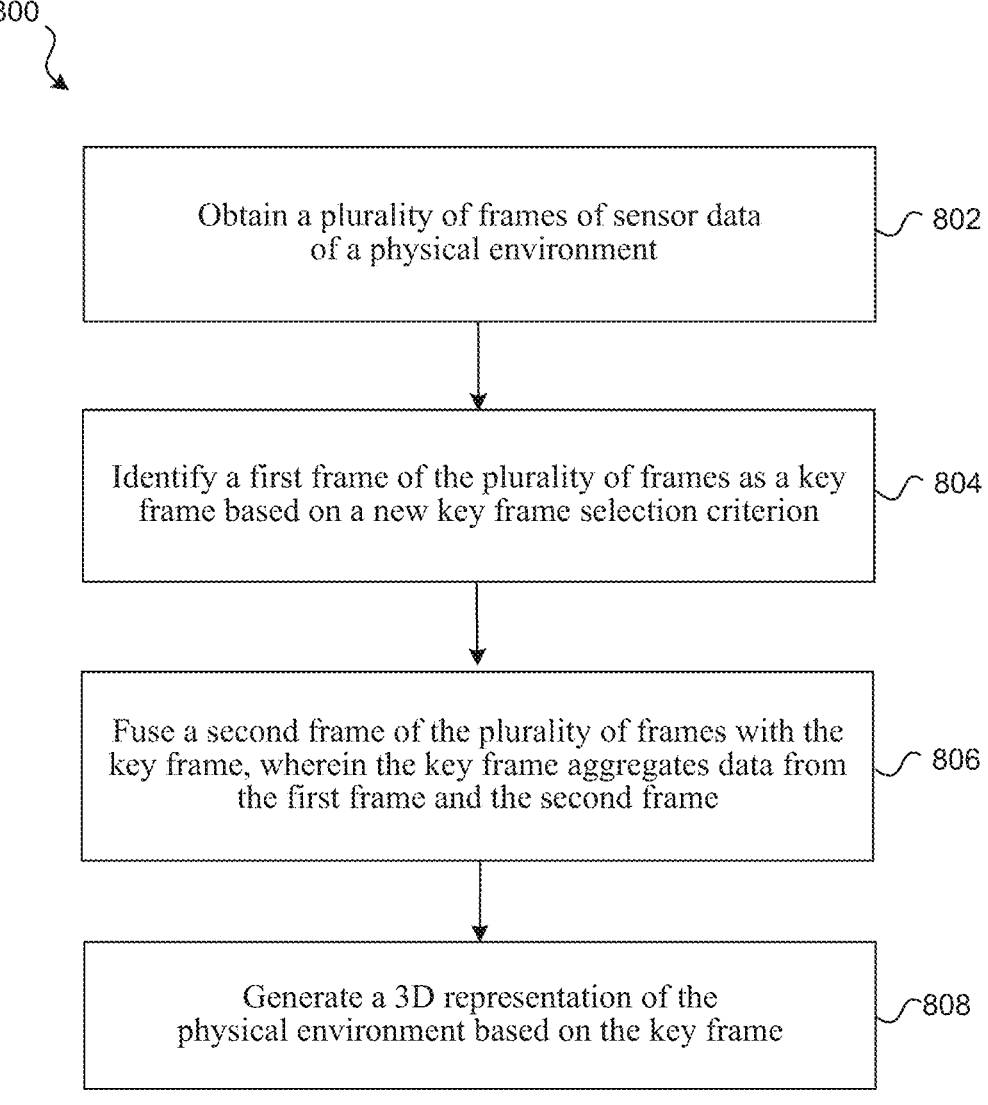

Obtain a plurality of frames of sensor data
of a physical environment    ⌇ 802

Identify a first frame of the plurality of frames as a key
frame based on a new key frame selection criterion    ⌇ 804

Fuse a second frame of the plurality of frames with the
key frame, wherein the key frame aggregates data from
the first frame and the second frame    ⌇ 806

Generate a 3D representation of the
physical environment based on the key frame    ⌇ 808

FIG. 8

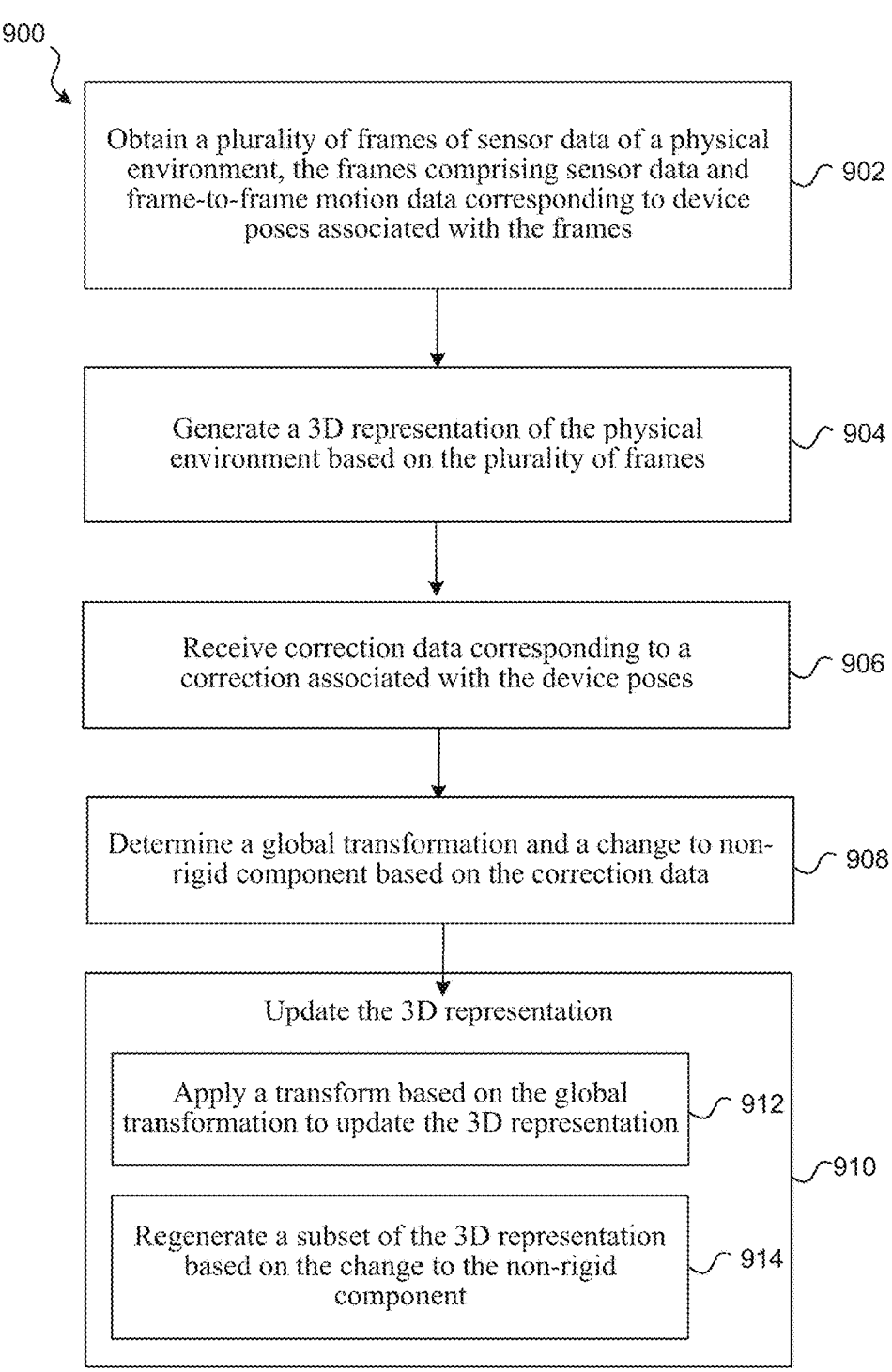

900

Obtain a plurality of frames of sensor data of a physical environment, the frames comprising sensor data and frame-to-frame motion data corresponding to device poses associated with the frames      902

Generate a 3D representation of the physical environment based on the plurality of frames      904

Receive correction data corresponding to a correction associated with the device poses      906

Determine a global transformation and a change to non-rigid component based on the correction data      908

Update the 3D representation

Apply a transform based on the global transformation to update the 3D representation      912

Regenerate a subset of the 3D representation based on the change to the non-rigid component      914

Device 1000

GENERATING 3D REPRESENTATIONS OF PHYSICAL ENVIRONMENTS USING KEY FRAMES

RELATED APPLICATION

This patent application claims the benefit of U.S. Provisional Application No. 63/348,777 filed on Jun. 3, 2022, entitled "Generating 3D Environment Representations," which is incorporated herein by this reference in its entirety.

TECHNICAL FIELD

The present disclosure generally relates to generating three-dimensional (3D) representations of physical environments, and in particular, to systems, methods, and devices that generate representations based on sensor data detected in physical environments.

BACKGROUND

Existing 3D representation systems and techniques may be improved with respect to assessing and using the sensor data to generate 3D representations representing physical environments.

SUMMARY

Various implementations disclosed herein include devices, systems, and methods that use sensor data to provide a 3D representation of a physical environment (e.g., a 3D mesh, planar representations, object bounding boxes, a combo of these, etc.). Some implementations use key frames (e.g., bundles of 2D image data deemed to be representative or useful for 3D representation generation). Such key frames may be created by evaluating multiple frames of sensor data and determining whether to convert a given frame into a key frame or fuse it, e.g., fuse it with a nearest existing key frame. Such fusing may reduce loss of information which would occur if frames not selected as key frames are simply discarded.

In some implementations, a processor performs a method by executing instructions stored on a computer readable medium. The method involves obtaining a plurality of frames of sensor data (e.g., light-based images, depth images, etc.) of a physical environment. The frames of sensor data may be captured while the device is moved along a path of multiple positions and multiple orientations within the physical environment, e.g., as a user uses the device while seated, walking around, or otherwise in the physical environment.

The method involves identifying a first frame of the plurality of frames as a key frame based on a new key frame selection criterion. The method involves fusing a second frame of the plurality of frames with that key frame, wherein the key frame aggregates data from the first frame and the second frame. Such fusing may be based on determining that the second frame does not satisfy the new key frame selection criterion, e.g., determining to fuse the frame rather than use it to generate a new key frame. The fusing may be provided by a spatiotemporal fusion engine configured to fuse data from a sequence of image data.

The method further involves generating a 3D representation of the physical environment based on the key frame. In some implementations, the 3D representation is based on volumetric meshing, e.g., using voxels that are generated based on sensor data to generate a mesh. Such voxels may use truncated signed distance field (TSDF) values that provide values for voxels within a threshold distance of a surface in the physical environment, where the values represent the distance to the nearest respective surface.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-D illustrate data used to determine whether to use previously-obtained key frames in a current 3D representation generation process in accordance with some implementations.

FIG. 8 is a flowchart illustrating a method for generating a 3D representation of a physical environment in accordance with some implementations.

FIG. 9 is a flowchart illustrating a method for updating a 3D representation of a physical environment in accordance with some implementations.

Figure 1:
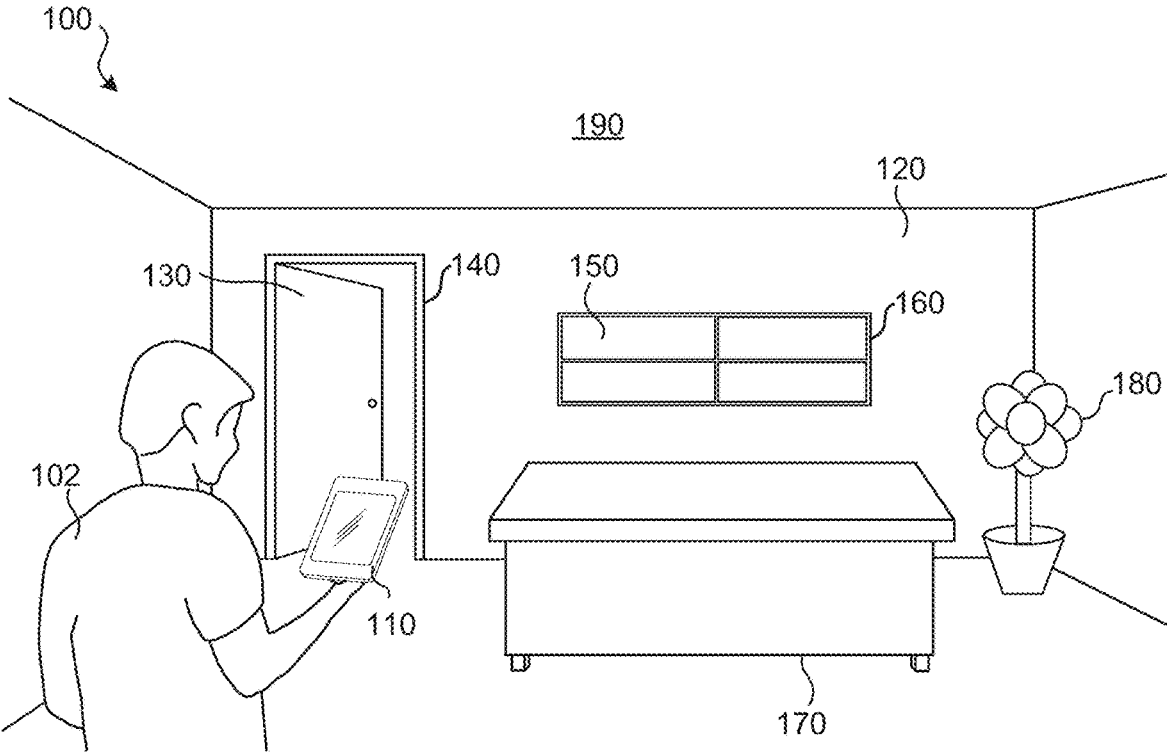
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a door 130, door frame 140, a window 150, and a window frame 160 on wall 120. The physical environment also includes a desk 170 and potted plant 180. The electronic device 110 includes one or more cameras, microphones, depth sensors, motion sensors, or other sensors that can be used to capture information about and evaluate the physical environment 100. The obtained sensor data may be used to generate a 3D representation, such as a 3D voxel representation, a 3D mesh, a 3D floor plan, a representation of the 3D positions of one or more planar surfaces, bounding box representations of one or more objects, a combination of such representations, etc.

In one example, the user 102 moves around the physical environment 100 and device 110 captures sensor data from which a 3D representation of the physical environment 100 is generated. The device 110 may be moved in way such that its sensor(s) capture(s) sensor data from different viewpoints, e.g., at various distances, viewing angles, heights, etc.

The device 110 may provide information to the user 102 that facilitates an environment scanning process. For example, the device 110 may provide a view from a camera showing the content of images currently being captured, e.g., a live camera feed, during the room scanning process. As another example, the device 110 may provide a view of a live 3D representation to facilitate a scanning process or otherwise provide feedback that informs the user 102 of which portions of the physical environment 100 have already been captured in sensor data and which portions of the physical environment 100 require more sensor data in order to be represented accurately in a 3D representation.

Various implementations disclosed herein include devices, systems, and methods that generate a 3D representation (e.g., a mesh of vertices that form connected triangles) representing 3D surface points and other surface characteristics of a physical environment's floors, walls, and other objects. The 3D representation may be generated using volumetric meshing, e.g., using voxels that are generated based on sensor data (e.g., image data, depth sensor data, etc.) to generate a mesh. Voxels may be generated by accumulating information volumetrically using truncated signed distance fields (TSDFs) that provide signed distance values for voxels within a threshold distance of a surface in the physical environment, where the values represent the distances of such voxels to the nearest respective surfaces in the physical environment.

Figure 2:
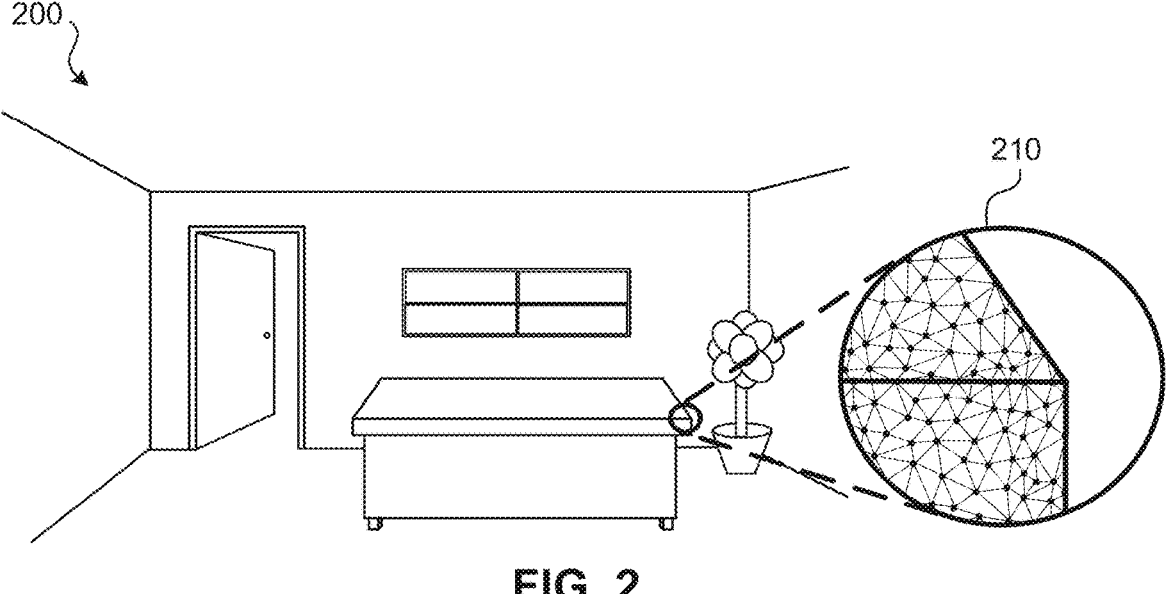
FIG. 2 illustrates a 3D representation representing the physical environment of FIG. 1 in accordance with some implementations.

FIG. 2 illustrates a 3D representation 200 representing the physical environment 100 of FIG. 1. In this example, sensor data (e.g., depth and/or light-based images such as RGB/greyscale images) was obtained of physical environment 100 as the device 110 was used in the physical environment.

During such use, the device 110 may have been moved by the user, i.e., having a movement path, along which the device 110 had different poses (i.e., positions and/or orientations) relative to the physical environment 100. Such sensor data may provide information about different portions of the physical environment (e.g., a first image may capture door 130 and desk 170, and not capture potted plant 180, while a second image may capture desk 170, potted plant 180, and not capture door 130).

The sensor data may be used to generate a 3D representation 200 of the physical environment 100. The 3D representation 200 may provide information about or define the surfaces within the physical environment 100, e.g., identifying planar regions, providing a point cloud representing points on surfaces, providing a mesh that represents the surfaces, providing voxels that represent portions of 3D space and distances to nearest surfaces, etc. In the example of FIG. 2, the 3D representation 200 is a 3D mesh in which surfaces are represented by vertices that form or define triangular regions, as illustrated in expanded view 210. Each such vertex may have a defined 3D position with adjacent vertices connected by edges that define triangular surface representation regions, i.e., faces. A 3D mesh can have face portions of any shape, e.g., triangular, square, pentagonal, etc.

In some implementations, a 3D mesh is generated by capturing sensor data that provides 2D information from one or more viewpoints, e.g., images of depth (distances away from sensor) and/or light intensity values from one or more camera/device poses, semantically-labelled images generated based on sensor images, etc. Such 2D information may be used to generate a 3D representation based on aligning the information represented within such images with one or more 3D coordinate systems. Such alignment may be, for example, based on recognizing common features amongst multiple 2D images and estimating the viewpoint/pose associated with each 2D image, using odometry or other motion data, using simultaneous localization and mapping (SLAM), and/or using other 2D-3D analysis or mapping techniques. In some implementations, 2D information, such as depth, light intensity images, semantically-labeled images, etc. is used to generate a voxel representation from which a 3D mesh is generated.

In some implementations, the 3D representation 200 additionally or alternatively includes parameterized surface and/or object definitions. For example, sensor data may be used to identify the surface of wall 120 and a parametric representation of wall 120 may be defined by specifying parameters, e.g., the two 3D coordinates of opposing corners of a planar region corresponding to the wall's surface. In another example, sensor data may be used to identify a bounding box approximately corresponding to the shape of desk 170, e.g., a rectangular cube around the desk 170. Such a bounding box may be defined, for example, by specifying the 3D coordinates of opposing corner points. In some implementations, 2D sensor data is used to generate planar or bounding box representations, e.g., directly or based on generating an intermediate 3D representation (e.g., a voxel representation) from which the planar and/or bounding box representations are generated.

Exemplary Pipeline

Figure 3A:
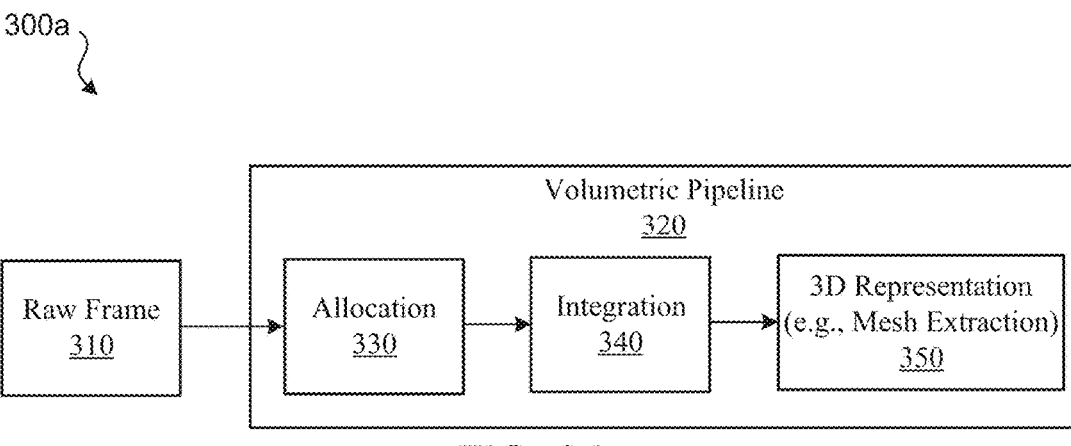
FIGS. 3A-B illustrate exemplary processes using frame data to generate 3D representations of physical environments in accordance with some implementations.
Figure 3B:
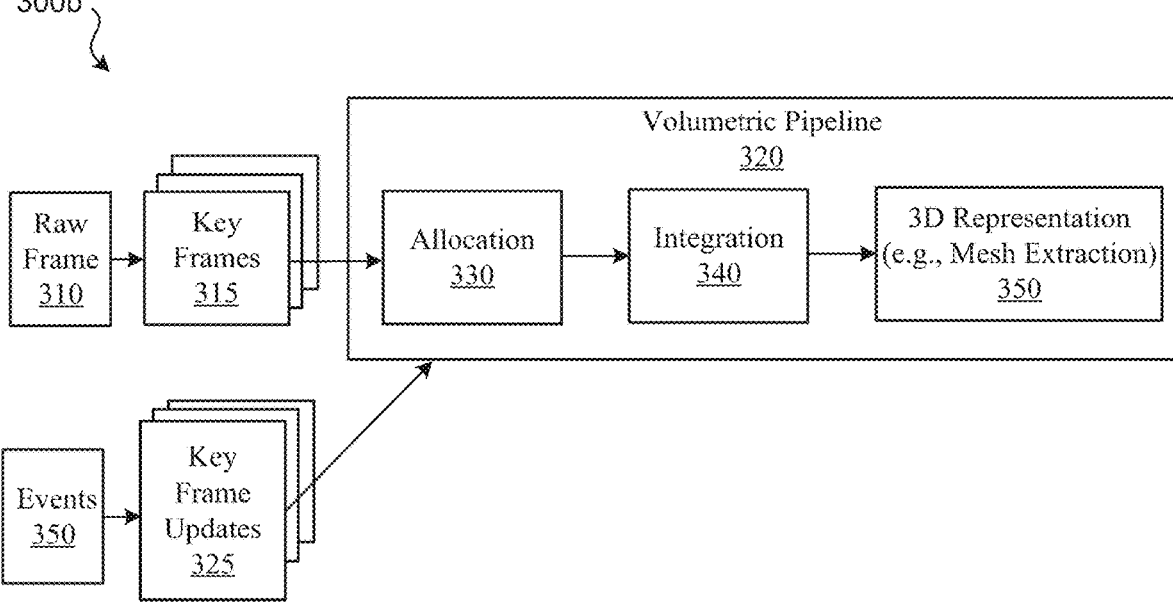

FIGS. 3A-B illustrate processes 300a-b that use frame data to generate 3D representations of physical environments. In FIG. 3A, the mesh generation process 300a involves obtaining raw frame data 310 (e.g., 2D images captured from depth, image, or other sensors, and/or 2D images generated therefrom such as semantically-labeled images). In some implementations, the raw frame data 310 is used to generate key frame data, e.g., by an initial mapping process. In some implementations, the raw frame data includes SLAM keyframes, which are then refined, fused, or otherwise processed for 3D representation purposes. In some implementations, data from an integrated SLAM process is used.

The pipeline 320 may utilize such raw frame data 310 (e.g., SLAM key frame data (e.g., content data) and SLAM process data (e.g., as device pose updates)) to generate and update a 3D representation such as a mesh. For example, the pipeline 320 may involve performing an allocation process 330, an integration process 340, and a mesh extraction process 350, as described below.

The allocation process 330 of the pipeline 320 generates voxels and/or allocates new or previously-generated voxels based on frame data (e.g., raw frame data 310 and/or key frames generated therefrom). Pose information may also be received or determined, identifying the viewpoint/sensor positions associated with the frames and/or keyframes. A voxel representation is generated based on the received data and represents the 3D positions of 3D blocks within a 3D coordinate system and, for each 3D block, the distance to the nearest surface detected based on the sensor data. For example, a given voxel may represent a 1×1×1 unit of space a few inches above the surface of desk 170 and will have a value representing that distance (e.g., 3 inches) based on that being the closest distance from the voxel to any surface so far detected in the physical environment 100.

New data (e.g., new frame data) may be received over time, for example, during a real time 3D representation generation process during which images are sequentially captured and used to continuously (e.g., periodically) update a 3D representation in real time.

The integration process 340 of the pipeline 320 integrates new voxel data and/or pose update changes into the voxel representation. Thus, the voxel representation may be adjusted as more and more frame data (e.g., raw and/or key frame) is received.

The mesh extraction process 350 of the pipeline 320 extracts the 3D mesh using the current voxel representations.

The mesh generation process 300b of FIG. 3B is similar to the mesh generation process 300a of FIG. 3A and further accounts a key frame process 315 and for events 350. With respect to key frame process 315, the pipeline 320 may consume key frames that are produced by key frame process 315 processing the raw frame data 310. The key framing process 315 may provide a compact data representation derived from redundant sensor data (e.g., redundant red-green-blue-depth (RGBD) input). The key frames may include bundles of 2D image data that are determined to be representative or otherwise useful for 3D representation. In some implementations, the raw data 310 is SLAM key frame data that is processed for use by the pipeline 320, e.g., by selecting only a subset of the SLAM key frames to use as reconstruction/3D representation generation key frames. In some implementations, SLAM key frames are fused (e.g., aggregating at least some of the key frames) to form reconstruction/3D representation generation key frames. Doing so my reduce processing in the pipeline while retaining information from the individual SLAM key frames, e.g., avoiding discarding SLAM key frames entirely and losing their data.

FIG. 3B also illustrates update events 350, e.g., SLAM update events. Such updates may provide key frame updates 325, e.g., SLAM events may be used to generate key frame updates. In some implementations, as SLAM event-based updates (e.g., pose updates to correct for drift, re-localization events, etc.) are received, the voxel representation is adjusted (e.g., based on adjusting the associated key frames). The pipeline 320 may react to SLAM events and may need to quickly process multiple key frames (e.g., 100+ key frames). One or more of the key frames or other anchors may be registered in a SLAM system. Such registration may facilitate receiving pose updates and enable the pipeline/meshing to react to SLAM events.

Live Real-Time Utilization

A 3D representation such as a 3D mesh of a physical environment may be generated live (i.e., in real-time) during a scanning of the environment. As data is received (e.g., frames of sensor data are generated), the 3D representation may be incrementally generated and adjusted. A view of the 3D representation that is being generated may be displayed live during the scanning process, e.g., on the scanning device. Such a view may provide various benefits, for example, helping the scanning user understand which portions of the environment have been scanned and how well such portions are represented in the 3D representation so far during the scan.

Exemplary Fusing of Frames to Provide Key Frames

The 3D representation may be generated based on frames of sensor data captured during a scanning process. Reconstruction key frames may be identified or generated for use in generating and/or updating a 3D representation of a physical environment. Reconstruction key frames, which are also referred to simply as "key frames" herein, may include bundles of data (e.g., 2D image data) deemed to be representative or otherwise useful for 3D representation generation and/or updating.

In one example, key frames are created by evaluating all raw frames and determining whether to convert a raw frame into a key frame or fuse it with a nearest existing key frame. Such fusing may reduce loss of information in identifying or generating key frames.

In some implementations, each key frame functions as a domain/container in which data is aggregated and summarized. Using such aggregation may be significant, for example, when data is (spatially) noisy and/or (temporally) unstable.

Figures 4, 5:
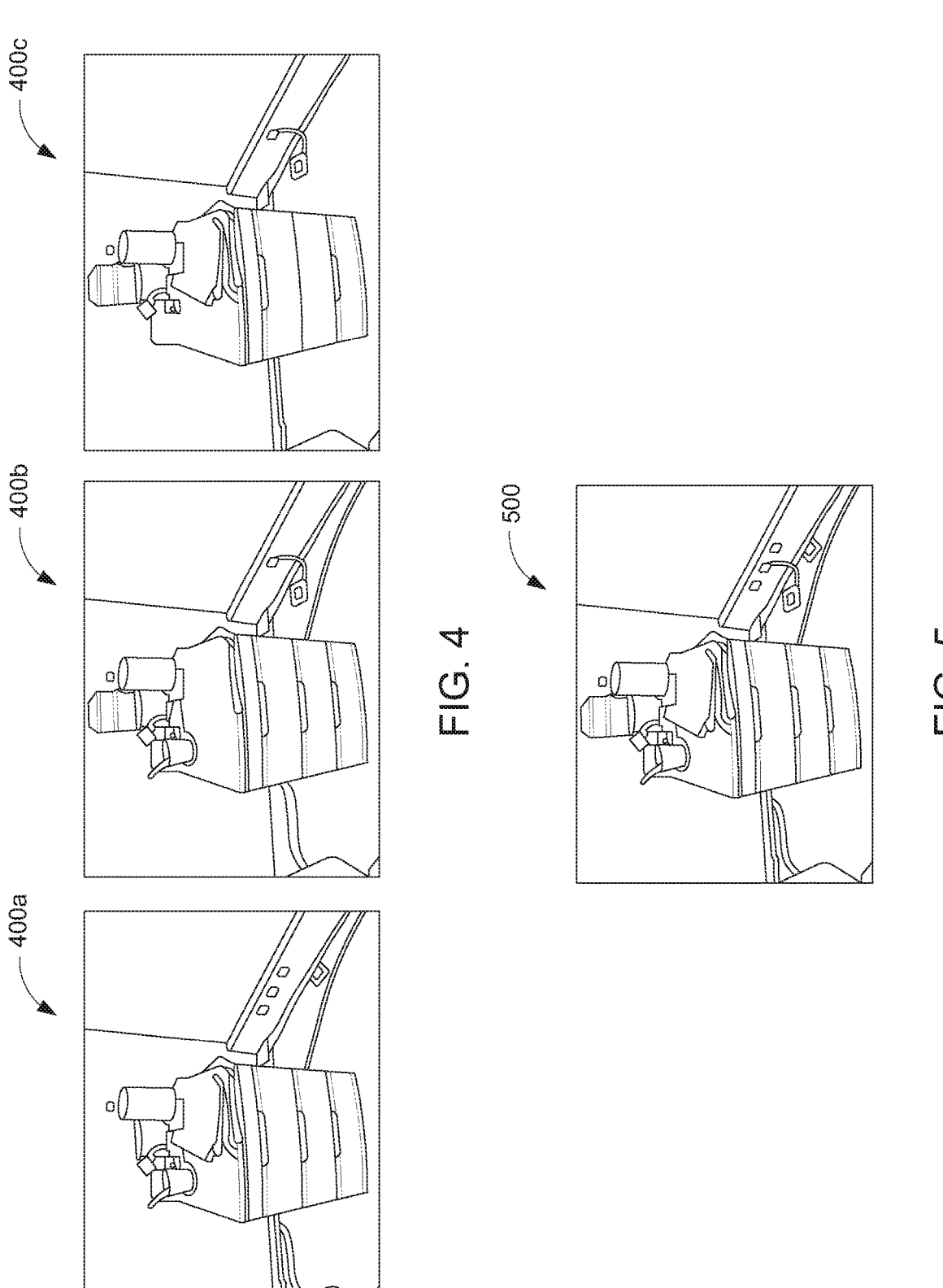
FIG. 4 illustrates multiple frames of sensor data captured in a physical environment in accordance with some implementations.
FIG. 5 illustrates a key frame that fuses information from the multiple frames of FIG. 4 in accordance with some implementations.

FIG. 4 illustrates multiple frames 400a-c of sensor data captured in a physical environment. In this example, the multiple frames 400a-c include a sequence of relatively noisy depth maps.

An algorithm, machine learning model, or other technique may be used to aggregate information from such multiple frames 400a-c into a single frame. FIG. 5 illustrates a key frame that fuses information from the multiple frames 400a-c of FIG. 4. For example, if frame 400a is selected to be a key frame, the data from frames 400b and 400c may be fused into that key frame to provide an aggregate keyframe 500 with more robust, accurate, and/or less noisy information about the surfaces of the physical environment 100.

A spatiotemporal fusion engine, e.g., configured to accurately summarize information from a sequence of data (e.g., images) in real time, may be used. In one example, a sequence of relatively noisy depth maps is input to such an engine which produces an aggregated image output.

Sensor/device pose data may be used to enable transforming/warping points from one frame to its nearby key frame(s) in order to continuously fuse the data into a common domain. In some implementations, all input frames are used, e.g., none are discarded without being used as either a new key frame or fused into an existing key frame. The resulting key frame depth may be relatively cleaner than otherwise, e.g., if based on a single frame rather than the fusion of multiple frames.

In some implementations, key frame can be image bundles hosting data of different modalities. For example, semantic segmentation images may be a part of an input stream and fused with images of other types. Such fusing of multiple types of image data may help reduce or eliminate temporal flickering/noise that may otherwise be observed.

Key frames may be used in generating a 3D representation, e.g., being used to update voxel data that is used to update a 3D mesh. In some implementations, a 3D representation is generated and updated during a live scan using all of the frames that are captured. In some implementations, only a subset of such frames are used (e.g., some frames are discarded without being used).

Using key frames may have benefits with respect to consuming compact data, supporting persistency, and loop closure events. It may also support integration with a SLAM system, which already generate SLAM key frames, e.g., SLAM key frames (which may be the raw frames 310) may be evaluated and selected for use as reconstruction key frames (which may be key frames 315) or combined into already selected reconstruction key frames (which also may be key frames 315).

Adaptive Frame Usage

In some implementations, frame usage is adaptive, e.g., using key fames during certain periods (e.g., during relatively fast device movement) and raw frames during other periods (e.g., during relatively slow device movement). In some implementations, when the scanning user/device are moving slowly, more raw frames are used than when the scanning user/device is moving quickly. This may improve occlusion correctness. The key framing thresholds that are used to identify when raw frames should be fused into key frames may be changed for different conditions, e.g., device speed, lighting, etc. Similarly, based on conditions such as device speed, the processing of information may be performed at different rates, e.g., faster processing when moving more quickly and vice versa.

Integration with a SLAM System

In some implementations, a SLAM or similar process is performed during the scanning process and provides SLAM key frames (i.e., raw frames) that are used in generating a 3D representation. For example, SLAM data may be used in updating voxel data that is used to update a 3D mesh. In some implementations, a 3D representation is generated and updated during a live scan using all of the frames from a SLAM or similar process. In some implementations, only a subset of such frames are used.

In some implementations, a SLAM process tracks the motion of the device/sensor(s) (e.g., using odometry) between frame captures and provides the capture frame information and the frame-to-frame motion data, e.g., for use in generating a 3D representation of a physical environment.

During such a 3D representation process, key frames (e.g., bundles of 2D image data deemed useful for reconstruction) may be generated and registered/anchored with the SLAM process.

The SLAM process may periodically analyze and update the current pose of the device (e.g., using a relatively more accurate process than is used to determine frame-to-frame movements) and provide updates to the previously-provided frame-specific data. It may provide data that corrects the previously-provided motion/trajectory data that the SLAM process provided, e.g., providing drift correction and relocalization correction events. These corrections may be used by a 3D representation system that uses the SLAM data to adjust the previously-received data and/or to adjust or modify the 3D representation of the environment that is being generated. During a live, real-time scanning and 3D representation process, such updating based on SLAM updates may be performed in real-time to update the current version of the 3D representation that is being generated.

Voxel Blocks

Some implementations perform an allocation process (e.g., as described with respect to FIGS. 3A-B) that generates voxels and/or allocates new or previously-generated voxels based on frame data. The allocation may utilize blocks of voxels, e.g., a 4×4×4 block of voxels, an 8×8×8 block of voxels, etc. Allocated voxel blocks may be registered into corresponding key frames. Thus, the allocation may involve identifying whether a key frame is relevant to and/or was used in generating a voxel block. The allocation may involve adjusting each voxel block and/or assessing how relevant a given key frame is to each voxel block (e.g., by maintaining a ranking or priority of the key frames that are relevant to each voxel block). Thus, each voxel may be generated and adjusted based on one or more key frames and each of those key frames "allocated" to the voxel blocks based on whether they were used in generating/adjusting it. Key frames may be tracked and used, along with the allocation data, to make revisions to the voxels and resulting 3D mesh.

The process may derive and adjust a mesh from voxel blocks attached to each of the key frames. The mesh extraction process (e.g., 350 of FIGS. 3A-B) may extract the 3D mesh using the current voxel representations. The pipeline may utilize quality-based judicious integration by intelligently integrating key frames, as described below. This may improve meshing quality, while consuming less power.

Adjustments Based on SLAM Events (Drift Adjustments)

The pipeline may adjust only some of a voxel representation of a 3D environment in response to a drift correction SLAM event. For example, only a subset of the voxels that are determined to be likely impacted by the drift correction SLAM event may be adjusted. Determining which voxels are likely to be impacted may be based on associating key frames with voxels or voxel blocks, identifying which key frames are impacted by the SLAM event based on SLAM anchoring, and then only adjusting the voxels or voxel blocks associated with some or all of those impacted key frames.

The process may adjust only a portion of a voxel representation of a 3D environment in response to a drift correction SLAM event based on the allocation having associated voxel blocks to one or more of the key frames. This selective updating may facilitate efficient usage of processing and power resources. To handle SLAM events with reasonable cost, allocated voxel blocks may be cached and then processed in response to SLAM events based on various criteria. For example, a SLAM event may provide a pose update that affects only 3 of the 10 key frames used so far and the allocation may be used to determine which voxel blocks are related to those 3 key frames, so that only the associated voxel blocks (and subsequent/corresponding portions of the 3D mesh) need to be updated.

Quality-Based Judicious Integration

In some implementations, a voxel block is updated only if a highly ranked key frame (e.g., the highest-ranked key frame or one of the top n highest-ranked key frames is updated) that is allocated to it is updated by the SLAM update. The key frame ranking may be based on factors associated with how significant a key frame is to a given voxel block, e.g., proximity of the key frame viewpoint to voxel block, viewing angle of the key frame viewpoint relative to voxel block, etc. For example, a key frame depicting a portion of a wall from up close at a head on angle may have a higher rank than a key frame depicting the portion of the wall from further away from an oblique angle. Since voxel blocks may be observed by/associated with multiple key frames, ranking provides useful information in identifying which of the multiple key frames associated with each voxel block are relevant for updating purposes. In some implementations, a voxel block is updated if one of its n most important/highly ranked key frames is updated and not updated if only less important/lower ranked key frames are updated.

A SLAM update may affect only a few key frames, many key frames, or all key frames. For example, a SLAM re-localization event may affect all key frames, e.g., providing a global shift of all key frames in a particular direction. Voxel Block Caching and Adjustments Based on SLAM Events (Re-Localization)

The process may adjust voxel blocks attached to one or more of the key frames when handling SLAM re-localization events to efficiently use processing and power resources. The process may rely on having one consistent coordinate system. This may enable content from multiple key frames to be fused into one global volume. However, this may conflict with a SLAM architecture's use of arbitrary coordinates, e.g., in which each key frame cluster is associated with an arbitrary coordinate system and only relative poses between anchors are tracked. This may result in a significant latency and unnecessary power drain.

One way of addressing this potential issue is to decouple the SLAM and 3D representation coordinates. A special meshing coordinate may be used to maintain a relationship with the SLAM system. For example, in order to capture the transformation between the two coordinate systems, an anchor to the SLAM system may be registered for the global volume (e.g., all voxels, the entire mesh, etc.) being used for the 3D representation. This may involve transforming all key frame poses with respect to this anchor. This enables the volume to be reused after anchor updates.

In some implementations, SLAM events are treated differently based on the type of SLAM event, e.g., the extent of the effect of the update. More global SLAM events that are expected to affect a relatively large set of the key frames (e.g., associated with rigid portions of the 3D representation) may be implemented by treating the key frame clusters using large scale/global transformations. This may reduce processing and power requirements. In some implementations, key frames are clustered into a single global cluster or local clusters to facilitate updating an entire voxel representation and/or mesh or large portions of the voxel representation and/or mesh in parallel, e.g., via a single operation and without having to recompute the voxel representation and/or mesh using the key frame data. In one example, a physical environment includes two rooms with a corridor connecting the rooms and each room has a cluster of key frames that are updated collectively in response to cluster-specific SLAM events. Each cluster may have an anchor into the SLAM system. In some implementations, such clustering is done automatically based on clustering criteria, e.g., based on change of room, strength of key frames, content consistency, distance from the viewpoint, distance from other key frames in other clusters, other spatial relationships, etc.

In some implementations, a global anchor is used to maintain relationships that map key frames with a user coordinate system. When this user coordinate system changes to another or a different user coordinate system, the global anchor has a known position in the changed user coordinate system that can then be used to transform the associated key frames (and associated voxels and mesh portions) to updated positions.

Using a global reference system can help reduce or avoid computationally expensive remeshing during re-localization. Without a global reference system, a mesh may need to be removed and then rebuilt during re-localization, whereas, using a global reference system, this can be avoided or limited to save processing and power resources.

The process may also optimize the orientation of a volume or other 3D representation of a physical environment. In particular, after knowing a wall direction (e.g., based on detecting a vertical wall or a wall having a size above a threshold, etc.) the volume or other 3D representation may be oriented, for example, in order to minimize aliasing artifact, maximize occupancy, or satisfy other requirements. This may enable mesh creation in a geometric-principal-axes-aligned coordinate system, which may improve quality and/or efficiency.

The pipeline may use a queue-based meshing task scheduling system to improve system stability. It may prioritize meshing tasks based on the importance of the frame and/or the real-time power budget.

Example Updating of 3D Representations

Some implementations use one or more meshing coordinates to handle SLAM updates. Some implementations use an anchor to track a meshing coordinate, perform an update to key frames, and then send to the changed key frames for meshing. This may facilitate the handling of relocalization events, e.g., providing relocalization success on one anchor.

Some implementations use all tracked key frames as anchors to track meshing coordinates. In such implementations, updates can be managed in meshing. This may facilitate handling relocalization events and loop closures, e.g., enabling relocalization to succeed on any tracked anchor. Anchors can be configured to optimize meshing coordinates and/or minimize or reduce remeshing and/or effectively increase relocalization success rate.

Some implementations, decompose input data (e.g., frame data) into multiple components. For example, input data may be decomposed into a global transformation component and a non-rigid parts component. This may enable handling of non-rigid deformations of a pose graph with reduced remeshing.

Figure 6A:
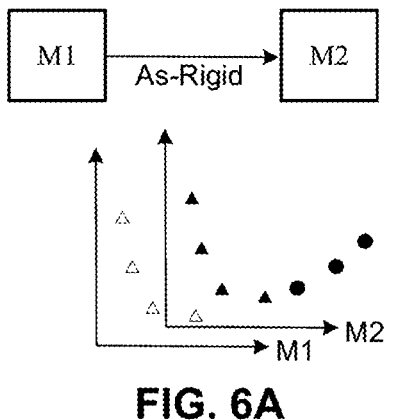
FIGS. 6A-B illustrate distinguishing global and local changes in correction data in accordance with some implementations.
Figure 6B:
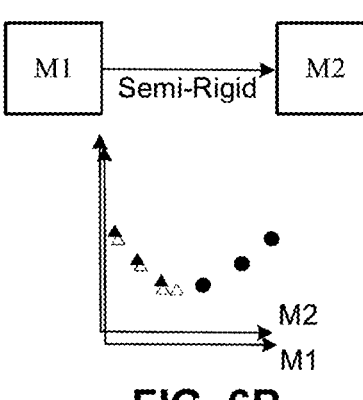

FIGS. 6A-B illustrate distinguishing global and local changes in correction data. FIG. 6A illustrates updates (M1→M2) to a pose graph that are entirely global (e.g., the transformation adjusts all positions in the same way) based on the update corresponding to a rigid structure. All anchors are transformed in the same way from one space to another. FIG. 6B illustrates updates (M1→M2) to a pose graph in which there is a non-rigid part of the update, e.g., relative poses between anchors changes.

Some implementations first estimate a global transform and then subtract the global changes from an update to provide information focused on local/non-rigid updates. Such deltas/changes may be relatively small, e.g., in comparison to making changes that do not subtract out global changes. These smaller changes may provide change, e.g., mesh deformations, that can be handled more efficiently that remeshing required to perform both combined (global/local) changes. Fewer anchors may require remeshing, i.e., some or all anchors may require only global transformation, which may be addressed without remeshing.

Utilization of Previously-Obtained Key Frames

A user of a device may use the device in a physical environment that was previously mapped, e.g., when the user uses their device on two different days in the same room. It may be desirable to reuse information from the prior mapping, e.g., using previously-obtained key frames, for example, to reduce computation and/or improve accuracy and speed of the current 3D representation generation process. However, portions of the physical environment may have changed, e.g., chairs or other furniture may have moved to new positions within the physical environment.

FIGS. 7A-D illustrate data used to determine whether to use previously-obtained key frames in a current 3D representation generation process. FIG. 7A illustrates the positioning 700 of objects in a current scene as captured by a key frame. FIG. 7B illustrates regions 710 of the physical environment that the key frame is currently being used to evaluate. FIG. 7C illustrates the positioning 720 of objects in a relocalized scene as captured by an exemplary previously-obtained key frame. It also illustrates regions 730 of the physical environment during the previous point in time at which the previously-obtained key frame was obtained. Some implementations compare the regions 710, 730, e.g., to identify overlap, changes, etc., and determine whether to reuse the previously-obtained data based on the comparison. If there are significant differences, the previously-obtained data may be excluded. Moreover, if the previously-obtained data is similar but does not represent currently represented regions of the physical environment than the previously-obtained data may be excluded in favor of using the more-recently obtained data. However, if the previously-obtained data is similar and also provides/represents regions of the physical environment not represented in the current data, the previously-obtained data may be used.

Method of Fusing Frames to Form a Key Frame

FIG. 8 is a flowchart illustrating a method for generating a 3D representation of a physical environment. In some implementations, a device such as electronic device 110 performs method 800. In some implementations, method 800 is performed on a mobile device, desktop, laptop, HMD, or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 involves obtaining a plurality of frames of sensor data (e.g., light-based images, depth images, etc.) of a physical environment. The sensor data may comprise depth images providing pixel values corresponding to distances of portions of the physical environment from sensor viewpoint positions along the path. The sensor data may comprise light intensity images providing pixel values corresponding to light intensity of light reflected from portions of the physical environment from sensor viewpoint positions along the path. The sensor data may comprise RGBD data. The sensor data may comprise semantic segmentation images providing pixel values corresponding to object types of portions of the physical environment from sensor viewpoint positions along the path.

The frames of sensor data may be captured while the device is moved along a path of multiple positions and multiple orientations within the physical environment, e.g., as a user uses the device while seated, walking around, or otherwise in the physical environment.

At block 804, the method 800 involves identifying a first frame of the plurality of frames as a key frame based on a new key frame selection criterion. Such a criterion may be associated with an amount of overlap between frame content, confidence in frame content, viewing angle associated with each frame, lighting associated with each frame, and/or other factors corresponding to whether a given frame adds new information (e.g., how much of what it depicts is not already in a keyframe) and/or how accurate the information is (e.g., whether the data is noisy, captured in circumstances associated with accurate versus inaccurate information, etc.). The new key frame selection criterion may assess similarity between an evaluated frame and one or more previously-identified key frames. The new key frame selection criterion may assess proximity between poses associated with an evaluated frame and one or more previously-identified key frames.

At block 806, the method involves fusing a second frame of the plurality of frames with the key frame, wherein the key frame aggregates data from the first frame and the second frame. FIGS. 4 and 5, discussed above, provide an example of fusing frames. Such fusing may be based on determining that the second frame does not satisfy the new key frame selection criterion, e.g., determining to fuse the frame rather than use it to generate a new key frame. The fusing may be provided by a spatiotemporal fusion engine configured to fuse data from a sequence of image data.

The fusing is based on determining that the second frame does not satisfy the new key frame selection criterion, e.g., since the second frame will not be used as a new key frame it will be fused with its nearest neighbor.

At block 808, the method 800 further involves generating a 3D representation of the physical environment based on the key frame. In some implementations, the 3D representation is based on volumetric meshing, e.g., using voxels that are generated based on sensor data to generate a mesh. Such voxels may use truncated signed distance field (TSDF) values that provide values for voxels within a threshold distance of a surface in the physical environment, where the values represent the distance to the nearest respective surface. The 3D representation may be a parametric representation of 3D positions of one or more planes of the physical environment. The 3D representation may be a bounding box representation of 3D positions of one or more objects of the physical environment.

In some implementations, the 3D representation is generated in real-time as the sensor data is captured while the device is moved along the path within the physical environment.

In some implementations, generating the 3D representation involves generating a voxel-based representation of the physical environment based on a set of key frames, the set of key frames including the key frame and generating a mesh-based representation of the physical environment based on the voxel-based representation.

In some implementations, the 3D representation is generated based an adaptive process in which key frames generated from the plurality of frames are used during period during which device movement is below a threshold and raw frames of the plurality of frames are used during period during which the device movement is above the threshold.

In some implementations, the plurality of frames are produced by a SLAM process, where the SLAM process tracks the motion of the device using odometry between SLAM frame captures and the SLAM process provides frame-to-frame motion data for use in generating the 3D reconstruction. The SLAM process may provide correction data that corrects previously-provided frame-to-frame motion data (e.g., providing drift corrections and re-localization events), wherein the 3D representation is adjusted based on the correction data. A SLAM process may provide a drift correction, where only a subset of a 3D representation (e.g., less than all of the voxels, mesh faces, etc.) are updated based on the drift correction.

In some implementations, the 3D representation is generated based on generating a voxel-based representation (e.g., a 4×4×4 block of voxels, an 8×8×8 block of voxels, etc.), where voxels within the voxel-based representation are updated selectively based on an assessment of relevance of a key frame to respective voxels.

In some implementations, updates are based on one or more anchors. The 3D representation may be updated based a single anchor with respect to which all key frames poses are transformed. In some implementations, a SLAM process provides correction data, where corrections having a scale above a threshold are treated using a first correction process (e.g., large, global transformations) and corrections having a scale below the threshold are treated using a second correction process different than the first correction process.

In some implementations, method 800 further involves receiving correction data corresponding to a correction associated with device poses associated with the frames. The method 800 may determine a global transformation and a change to non-rigid component based on the correction data. The method 800 may update the 3D representation by applying a transform based on the global transformation to update the 3D representation (e.g., updating anchors without remeshing) and regenerating a subset of the 3D representation based on the change to the non-rigid component.

In some implementations, the 3D representation is generated based on: identifying previously-obtained key frames associated with the physical environment; comparing the previously-obtained key frames with the plurality of frames of sensor data; and determining whether to use one or more of the previously-obtained key frames to generate the 3D representation based on the comparing.

FIG. 9 is a flowchart illustrating a method for updating a 3D representation of a physical environment. In some implementations, a device such as electronic device 110 performs method 900. In some implementations, method 900 is performed on a mobile device, desktop, laptop, HMD, or server device. The method 900 is performed by processing logic, including hardware, firmware, software, or a combination thereof. In some implementations, the method 900 is performed on a processor executing code stored in a non-transitory computer-readable medium (e.g., a memory).

At block 902, the method 900 involves obtaining a plurality of frames of sensor data of a physical environment, the frames comprising sensor data and frame-to-frame motion data corresponding to device poses (e.g., positions and orientations) associated with the frames. At block 904, the method involves generating a 3D representation of the physical environment based on the plurality of frames. At block 906, the method involves receiving correction data corresponding to a correction associated with the device poses. At block 908, the method involves determining a global transformation and a change to non-rigid component based on the correction data. At block 910, the method involves updating a 3D representation. Updating the 3D representation involves, at block 912, applying a transform based on the global transformation to update the 3D representation (e.g., updating anchors without remeshing) and, at block 914, regenerating a subset of the 3D representation based on the change to the non-rigid component (e.g., re-meshing a portion of a 3D mesh). Applying the transform may involve updating anchor positions linking the 3D representation to the frames.

Figure 10:
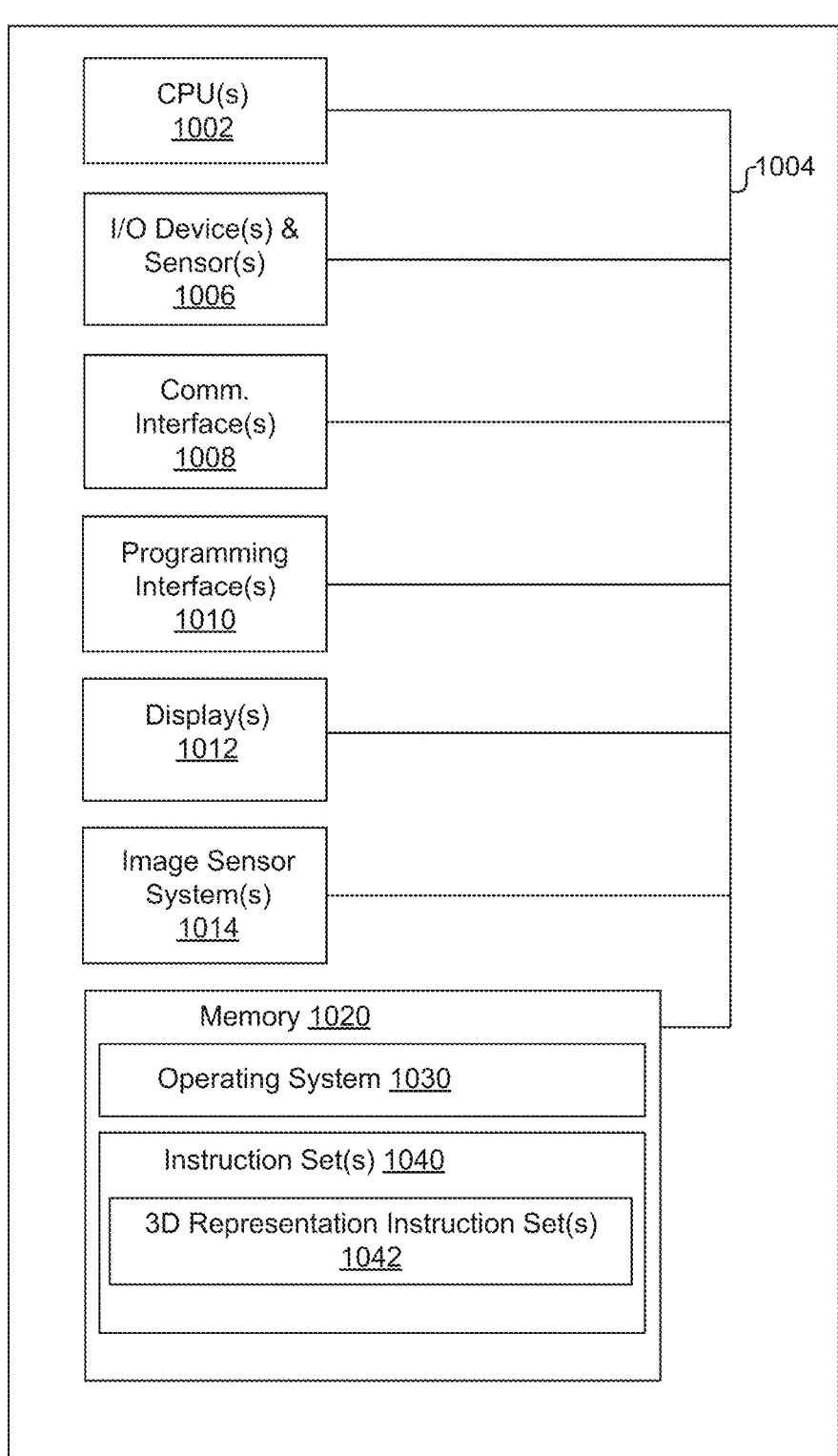
FIG. 10 is a block diagram of an electronic device of in accordance with some implementations.

FIG. 10 is a block diagram of electronic device 1000. Device 1000 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, and/or the like type interface), one or more programming (e.g., I/O) interfaces 1010, one or more output device(s) 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device (s) 1012 include one or more displays configured to present a view of a 3D environment to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. wave-guide displays. In one example, the device 1000 includes a single display. In another example, the device 1000 includes a display for each eye of the user.

In some implementations, the one or more output device (s) 1012 include one or more audio producing devices. In some implementations, the one or more output device(s) 1012 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s)

in the 3D environment (e.g., from one or more particular sound sources) even though the actual sounds may be produced by speakers in other locations. The one or more output device(s) 1012 may additionally or alternatively be configured to generate haptics.

In some implementations, the one or more image sensor systems 1014 are configured to obtain image data that corresponds to at least a portion of a physical environment. For example, the one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include a 3D representation instruction set 1042 configured to, upon execution, generate and/or update 3D representations of physical environments as described herein. The instruction set(s) 1040 may be embodied as a single software executable or multiple software executables.

Although the instruction set(s) 1040 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
       obtaining a plurality of frames of sensor data of a physical environment, the frames of sensor data captured while the device is moved along a path of multiple positions and multiple orientations within the physical environment;
       identifying a first frame of the plurality of frames as a key frame based on a new key frame selection criterion, wherein the new key frame selection criterion assesses similarity between an evaluated frame and one or more previously-identified key frames;

determining to fuse a second frame of the plurality of frames with the key frame based on the second frame not being identified as another key frame based on the new key frame selection criterion;

fusing the second frame of the plurality of frames with the key frame, wherein the key frame aggregates data from the first frame and the second frame; and generating a 3D representation of the physical environment based on the key frame.

2. The method of claim 1, wherein the sensor data comprises depth images, the depth images comprising pixel values corresponding to distances of portions of the physical environment from sensor viewpoint positions along the path.

3. The method of claim 1, wherein the sensor data comprises light intensity images, the light intensity images comprising pixel values corresponding to light intensity of light reflected from portions of the physical environment from sensor viewpoint positions along the path.

4. The method of claim 1, wherein the sensor data comprises semantic segmentation images, the semantic segmentation images comprising pixel values corresponding to object types of portions of the physical environment from sensor viewpoint positions along the path.

5. The method of claim 1, wherein the new key frame selection criterion assesses proximity between poses associated with an evaluated frame and one or more previously-identified key frames.

6. The method of claim 1, wherein the fusing is performed by a spatiotemporal fusion engine configured to fuse data from a sequence of images.

7. The method of claim 1, wherein the 3D representation is generated in real-time as the sensor data is captured while the device is moved along the path within the physical environment.

8. The method of claim 1, wherein the 3D representation is a parametric representation of 3D positions of one or more planes of the physical environment.

9. The method of claim 1, wherein the 3D representation is a bounding box representation of 3D positions of one or more objects of the physical environment.

10. The method of claim 1, wherein generating the 3D representation comprises:

generating a voxel-based representation of the physical environment based on a set of key frames, the set of key frames including the key frame; and generating a mesh-based representation of the physical environment based on the voxel-based representation.

11. The method of claim 1, wherein the 3D representation is generated based an adaptive process in which key frame fusion is only performed during periods in which device movement is above a threshold.

12. The method of claim 1, wherein the 3D representation is generated based an adaptive process in which:

key frames generated from the plurality of frames are used during periods during which device movement is above a threshold; and raw frames of the plurality of frames are used during periods during which the device movement is below the threshold.

13. The method of claim 1, wherein the plurality of frames are produced by a simultaneous localization and mapping (SLAM) process, wherein the SLAM process tracks the motion of the device using odometry between SLAM frame captures and the SLAM process provides frame-to-frame motion data for use in generating the 3D reconstruction.

14. The method of claim 13, wherein the SLAM process provides correction data that corrects previously-provided frame-to-frame motion data, wherein the 3D representation is adjusted based on the correction data.

15. The method of claim 1, wherein the 3D representation is generated based on generating a voxel-based representation, wherein voxels within the voxel-based representation are updated selectively based on an assessment of relevance of a key frame to respective voxels.

16. The method of claim 15, wherein a simultaneous localization and mapping (SLAM) process provides a drift correction, wherein only a subset of less than all of the voxels are updated based on the drift correction.

17. The method of claim 1, wherein the 3D representation is updated based a single anchor with respect to which all key frames poses are transformed.

18. The method of claim 1, wherein a simultaneous localization and mapping (SLAM) process provides correction data, wherein:

corrections having a scale above a threshold are treated using a first correction process; and (e.g., large, global transformations)

corrections having a scale below the threshold are treated using a second correction process different than the first correction process.

19. The method of claim 1 further comprising:

receiving correction data corresponding to a correction associated with device poses associated with the frames;

determining a global transformation and a change to non-rigid component based on the correction data; and updating a 3D representation by:

applying a transform based on the global transformation to update the 3D representation; and regenerating a subset of the 3D representation based on the change to the non-rigid component.

20. The method of claim 1, wherein the 3D representation is generated based on:

identifying previously-obtained key frames associated with the physical environment;

comparing the previously-obtained key frames with the plurality of frames of sensor data; and determining whether to use one or more of the previously-obtained key frames to generate the 3D representation based on the comparing.

21. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining a plurality of frames of sensor data of a physical environment, the frames of sensor data captured while the device is moved along a path of multiple positions and multiple orientations within the physical environment;

identifying a first frame of the plurality of frames as a key frame based on a new key frame selection criterion, wherein the new key frame selection criterion assesses similarity between an evaluated frame and one or more previously-identified key frames;

determining to fuse a second frame of the plurality of frames with the key frame based on the second frame not being identified as another key frame based on the new key frame selection criterion;

fusing the second frame of the plurality of frames with the key frame, wherein the key frame aggregates data from the first frame and the second frame; and generating a 3D representation of the physical environment based on the key frame.

\* \* \* \* \*